(12) United States Patent
Bulick

(10) Patent No.: US 12,738,526 B2
(45) Date of Patent: Sep. 15, 2026

(54) BATTERY AND BATTERY WITH SPRING PLATE

(71) Applicant: SAFT AMERICA, Cockeysville, MD (US)

(72) Inventor: Christopher Bulick, Abingdon, MD (US)

(73) Assignee: SAFT AMERICA, Cockeysville, MD (US)

( * ) Notice: Subject to any disclaimer, the term of this patent is extended or adjusted under 35 U.S.C. 154(b) by 749 days.

(21) Appl. No.: 18/174,206

(22) Filed: Feb. 24, 2023

(65) Prior Publication Data

US 2024/0291017 A1 Aug. 29, 2024

(51) Int. Cl.

| | |
|---|---|
| ***H01M 50/211*** | (2021.01) |
| ***H01M 10/04*** | (2006.01) |
| ***H01M 50/271*** | (2021.01) |

(52) U.S. Cl.

CPC ..... *H01M 10/0481* (2013.01); *H01M 50/211* (2021.01); *H01M 50/271* (2021.01)

(58) Field of Classification Search

None

See application file for complete search history.

(56) References Cited

U.S. PATENT DOCUMENTS

| | | | | |
|---|---|---|---|---|
| 10,446,894 | B2 | 10/2019 | Paramasivam et al. | |
| 2011/0262797 | A1* | 10/2011 | Kim | H01M 10/4207 429/149 |
| 2015/0214570 | A1* | 7/2015 | Deponte | H01M 50/242 29/623.5 |
| 2019/0027797 | A1 | 1/2019 | Paramasivam et al. | |
| 2019/0372147 | A1 | 12/2019 | Matsumura et al. | |
| 2021/0151830 | A1 | 5/2021 | Shayan et al. | |
| 2022/0359902 | A1* | 11/2022 | Milobar | H01M 50/291 |

FOREIGN PATENT DOCUMENTS

| | | | |
|---|---|---|---|
| WO | 2022/019445 | A1 | 1/2022 |
| WO | 2022/108279 | A1 | 5/2022 |

OTHER PUBLICATIONS

Extended European Search Report dated Jul. 12, 2024 in Application No. 24155936.8.

* cited by examiner

*Primary Examiner* — Maria Laios

(74) *Attorney, Agent, or Firm* — Sughrue Mion, PLLC

(57) ABSTRACT

A battery including a housing, a plurality of battery cells in the housing, and a spring plate providing a biasing force against the plurality of battery cells. The spring plate is configured such that a tension of the spring plate may be adjusted from outside of the housing.

13 Claims, 6 Drawing Sheets

100
520
525
500
510
530
510
540

BATTERY AND BATTERY WITH SPRING PLATE

FIELD OF THE INVENTION

The present disclosure relates to a battery and, more particularly, to a battery in which a compressive force is applied to one or more battery cells by a spring plate.

BACKGROUND

A battery may include one or more battery cells. It may be useful to apply a compressive force to the battery cells. In particular, if the battery cells are pouch battery cells or include a lithium chemistry, it may be useful to apply a compressive force to the battery cells.

Various attempts have been made to provide a force against battery cells. For example, U.S. Patent Application Publication No. 2019/0027997 discloses an array plate assembly including a spring plate adapted to exert a compressive spring force against the at least one cell. U.S. Patent Application Publication No. 2021/0151830 discloses batteries with components including carbon fiber and applying a force to electrochemical cells in the battery.

Example embodiments of the present application are related to a battery with an improved construction that may aid in assembly of the battery and provide for a simplified construction that provides a compressive force as a state of charge of battery cells of the battery changes. For example, according to examples of the present application, a battery may include a housing and a spring plate within the housing. The housing and spring plate may be configured such that tension of the spring plate may be adjustable from outside the housing. Adjusting a tension of the spring plate from outside the housing may allow a user to create space in the battery housing to allow for easy insertion and assembly of battery cells. Additionally, in an example embodiment, the battery may have a spring plate with a radius of curvature that varies along with a state of charge of the battery cells. Due to the changing radius of curvature, the spring plate may provide a compressive force throughout a charging and discharging cycle as the battery cells shrink and expand. The spring plate of example embodiments of the present application may provide a compressive force through another component such as a top plate. Thus, according to example embodiment, a battery may have an improved construction that aids in assembly and provides a simple and efficient design for providing a compressive force even as a state of charge of battery cells change.

SUMMARY

Aspects of example embodiments relate to a battery, and more particularly, to a battery including battery cells that are compressed by a force applied by a spring plate. Aspects of example embodiments also relate to a spring plate that is adjustable from outside of a housing and assembly of battery cells into a housing.

According to an aspect of an example embodiment, a battery includes: a housing; a plurality of battery cells in the housing; a spring plate providing a biasing force against the plurality of battery cells; wherein the spring plate is configured such that a tension of the spring plate may be adjusted from outside of the housing.

A top plate may be disposed in the housing.

The spring plate may provide a biasing force against the plurality of battery cells through the top plate.

The spring plate may include carbon fibers.

The top plate may include an engagement portion configured to be engaged by a tensioner.

The engagement portion may be configured to allow a radius of curvature of the spring plate to be changed from outside of the housing via the tensioner.

The spring plate may be curved.

A radius of curvature of the spring plate may vary as a state of charge of one or more of the plurality of battery cells changes.

The radius of curvature of the spring plate may increase as one or more of the plurality of battery cells is discharging.

The radius of curvature may be configured to vary such that a maximum of the radius of curvature is 50% or more greater than a minimum of the radius of curvature.

The top plate may be substantially flat.

The plurality of battery cells may include pouch battery cells.

The housing may be rigid.

According to an aspect of an example embodiment, a battery assembly, includes: a housing having a top and a bottom; a plurality of battery cells disposed in the housing; a bottom plate below the plurality of battery cells and adjacent to the bottom of the housing; a top plate above the plurality of battery cells; a spring plate between the top plate and the top of the housing; wherein the spring plate is curved and has a radius of curvature; wherein the spring plate is configured to provide a biasing force to the plurality of battery cells through the top plate.

The top of the housing may have an opening through which the spring plate is configured to be engaged.

The spring plate may have an engagement portion.

The engagement portion may be accessible through the opening in the housing.

The engagement portion may be configured to be engaged by a tensioner.

A radius of curvature of the spring plate may vary as a state of charge of one or more of the plurality of battery cells changes.

The radius of curvature of the spring plate may increase as one or more of the plurality of battery cells is discharging.

The radius of curvature may be configured to vary such that a maximum of the radius of curvature is 50% or more greater than a minimum of the radius of curvature.

According to an aspect of an example embodiment, a method of assembling includes: providing a housing; providing a spring plate in the housing; tensioning the spring plate from outside the housing through an opening in the housing by a tensioner; inserting a plurality of battery cells into the housing; and releasing the tensioning of the spring plate by the tensioner.

The method may further include assembling a lid on the housing to enclose the plurality of battery cells and the spring plate in the housing.

The method may further include the spring plate being curved.

A radius of curvature of the spring plate may vary as the plurality of battery cells are discharging.

BRIEF DESCRIPTION OF THE DRAWINGS

The above and other aspects and features will be more apparent from the following description of example embodiments, taken in conjunction with the accompanying drawings, in which.

DETAILED DESCRIPTION

Figure 1:
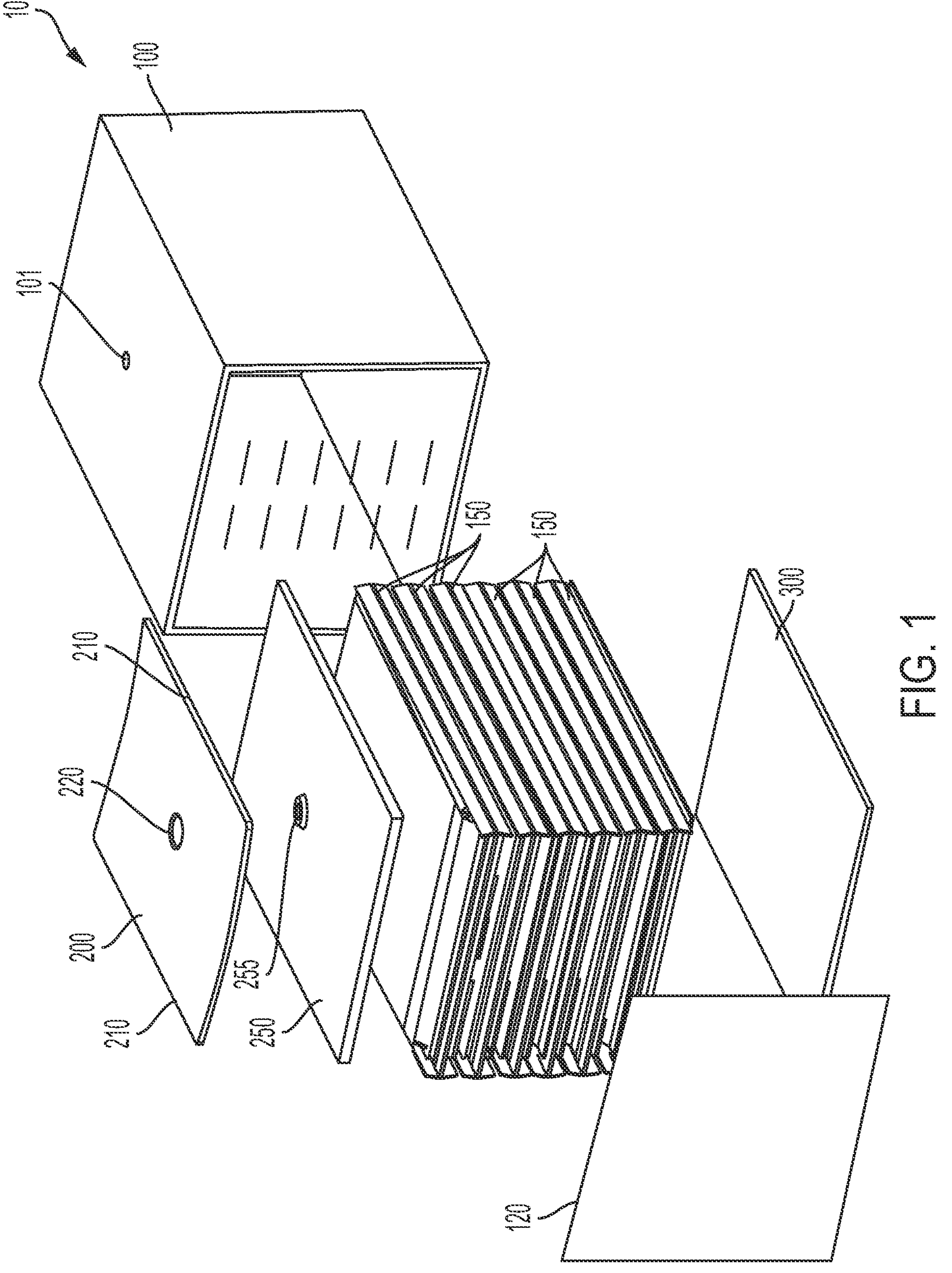
FIG. 1 illustrates an exploded view of a battery according to an example embodiment.

The following description illustrates the claimed invention by way of example and not by way of limitation. The description clearly enables one skilled in the art to make and use the disclosure, describes several embodiments, adaptations, variations, alternatives, and uses of the disclosure, including what is presently believed to be the best mode of carrying out the claimed invention. Additionally, it is to be understood that the disclosure is not limited in its application to the details of construction and the arrangements of components set forth in the following description or illustrated in the drawings. The disclosure is capable of other embodiments and of being practiced or being carried out in various ways. Also, it is to be understood that the phraseology and terminology used herein is for the purpose of description and should not be regarded as limiting. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Figure 2:
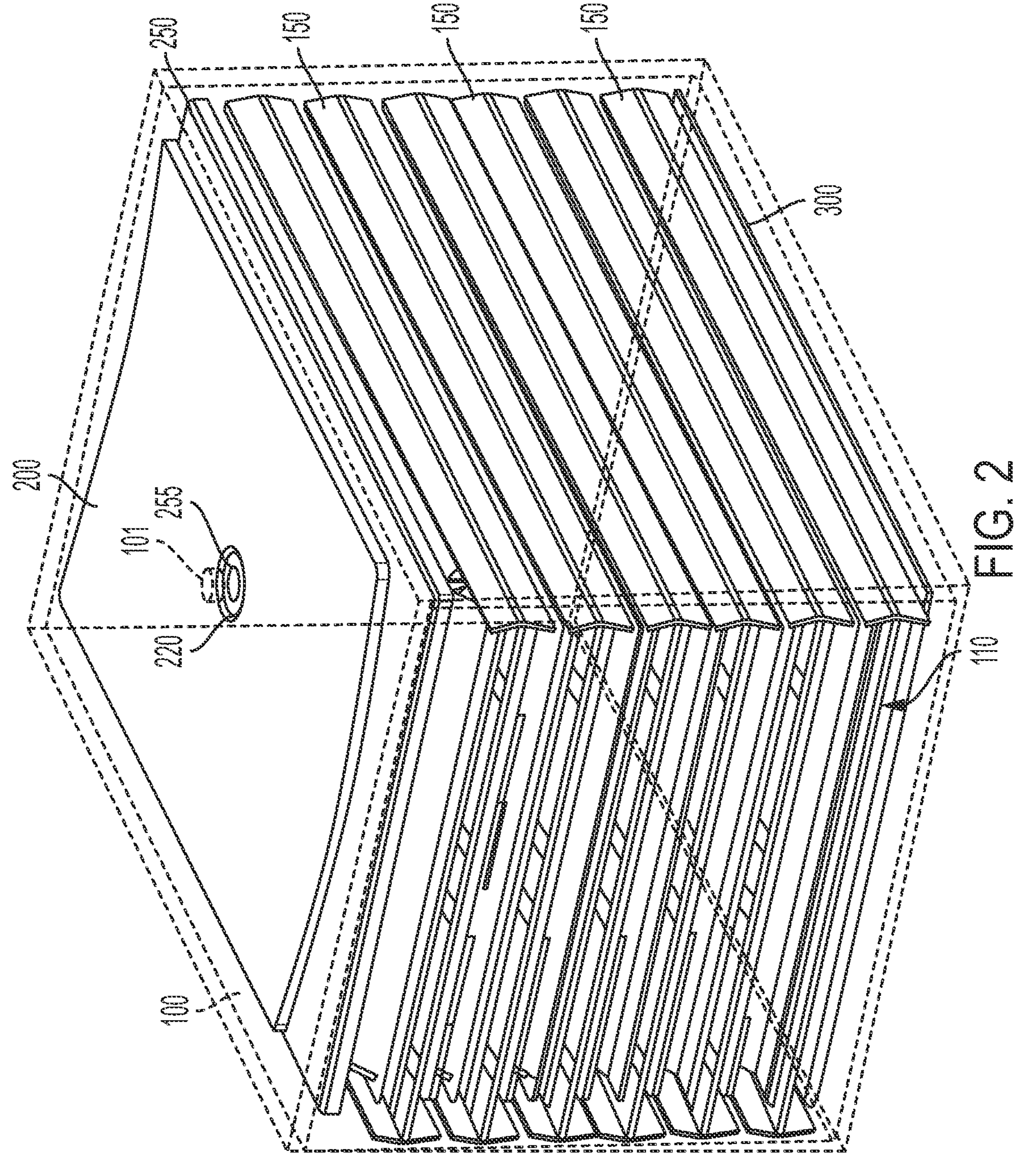
FIG. 2 illustrates an assembled view of a battery according to an example embodiment.

FIGS. 1 and 2 illustrate an embodiment of a battery 10. FIG. 1 is an exploded view of the battery 10 and FIG. 2 is a view of the battery 10 with a housing in shadow to illustrate internal components.

As shown in FIGS. 1 and 2, the battery 10 includes a housing 100. The housing 100 may have a generally rectangular box shape. Additionally, the housing 100 may be rigid and may be made out of a rigid material such as a metal, for example, steel. The housing 100 has a front opening 110 through which battery cells 150 and other components may be inserted. The battery 10 may also include a lid 120 for closing the front opening 110. The lid 120 may cover the front opening 110 to enclose the battery cells 150 and other components in the housing 100. The lid 120 may be shaped generally to correspond to the shape of the front opening 110 and may be attached to the housing 100 by fasteners such as, for example, screws or rivets. The housing 100 also includes an opening 101 in a top surface thereof.

As shown in FIGS. 1 and 2, the battery 10 includes a bottom plate 300. The bottom plate 300 is situated adjacent to a bottom of the housing 100. The bottom plate 300 may be substantially flat and rectangular and has a size and shape roughly corresponding to an inside bottom surface of the housing 100. The bottom plate 300 also has a size and shape that roughly corresponds to a size and shape of a bottom surface of the plurality of battery cells 150. The bottom plate 300 may be rigid and may include a rigid material such as a metal, for example, steel, though the material is not limited thereto.

A plurality of battery cells 150 sit on the bottom plate 300. The number of battery cells 150 is not particularly limited and there may be one, two, three or more battery cells 150. The plurality of battery cells 150 may be stacked on top of one another so that the plurality of battery cells 150 are a plurality of stacked battery cells 150. The battery cells 150 may be pouch type battery cells 150. The battery cells 150 may include lithium. The battery cells can be secondary battery cells or primary battery cells. The battery cells can be for example Lithium-ion battery cells or primary lithium battery cells. The battery 10 may include electrical tabs connected to the battery cells 150 through which electrical power from the battery cells 150 may be transmitted to power a device.

A top plate 250 is disposed on a top surface of the plurality of battery cells 150. The top plate 250 is generally rectangular in shape and has a shape that roughly correspond to a top surface of the plurality of battery cells 150. The top plate 250 may be substantially flat. The top plate 250 has an engagement portion in the form of connector 255 at a central location thereof. The connector 255 may be a threaded connector such as a mounting nut. The engagement portion 255 may be engaged by a tensioner 500, as described further below, so change a position of the top plate 250 and compress the spring plate 200 so as to adjust a tension of the spring plate 200.

A spring plate 200 is disposed between the top plate 250 and an inner top surface of the housing 100. The spring plate 200 has a curved shape such that a central portion of the spring plate 200 contacts the top plate 250 and edges 210 of the spring plate contact an inner top surface of the housing 100, as shown in more detail in FIGS. 3 and 4.

The spring plate 200 is resilient and serves as a dynamic compression force mechanism that provides a compressive force to the battery cells 150 through the top plate 250. The spring plate 200 may include a carbon fiber material. For example, the spring plate may be a carbon fiber reinforced spring plate 200. In an example embodiment in which the spring plate 200 includes carbon fiber material, there may be an advantage with weight savings. That is, a weight of the spring plate 200 and thus the battery 10 may be reduced as compared to using other materials not including a carbon fiber material. Additionally, a material strength per weight may be beneficial. That is, the spring plate 200 may have a high material strength for its weight. The spring plate 200 may also have favorable tensile properties such as a high tensile property and customized layups and configurations may be possible. That is, a layup direction of the battery may be customized or adjusted depending on a performance desired for a particular battery and application of a particular battery. The spring plate 200 includes an opening 220 that may be referred to as spring plate opening 220.

Figure 4:
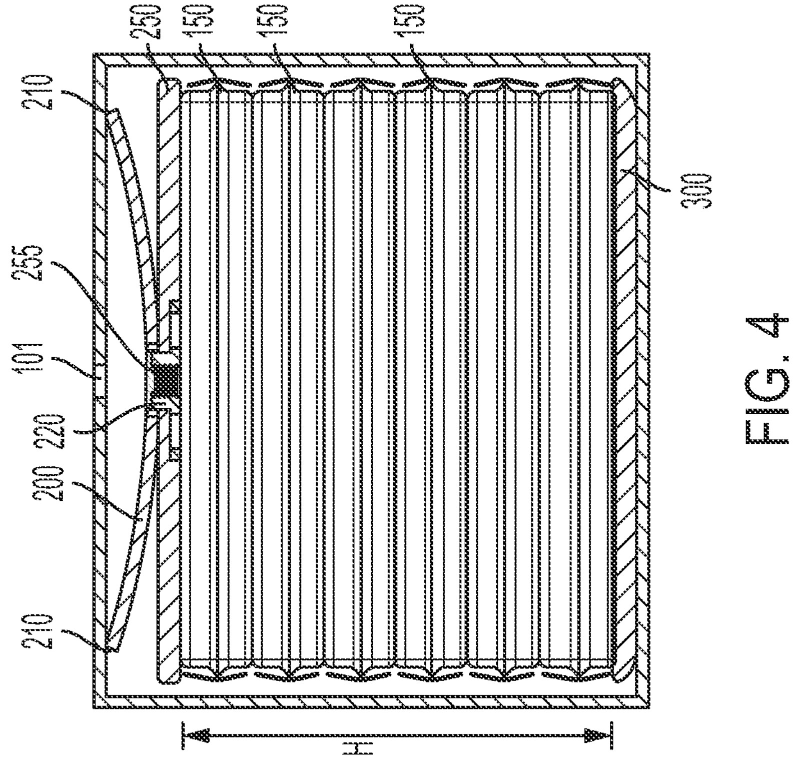
FIG. 4 illustrates another cross-sectional view of a battery according to an example embodiment.
Figure 3:
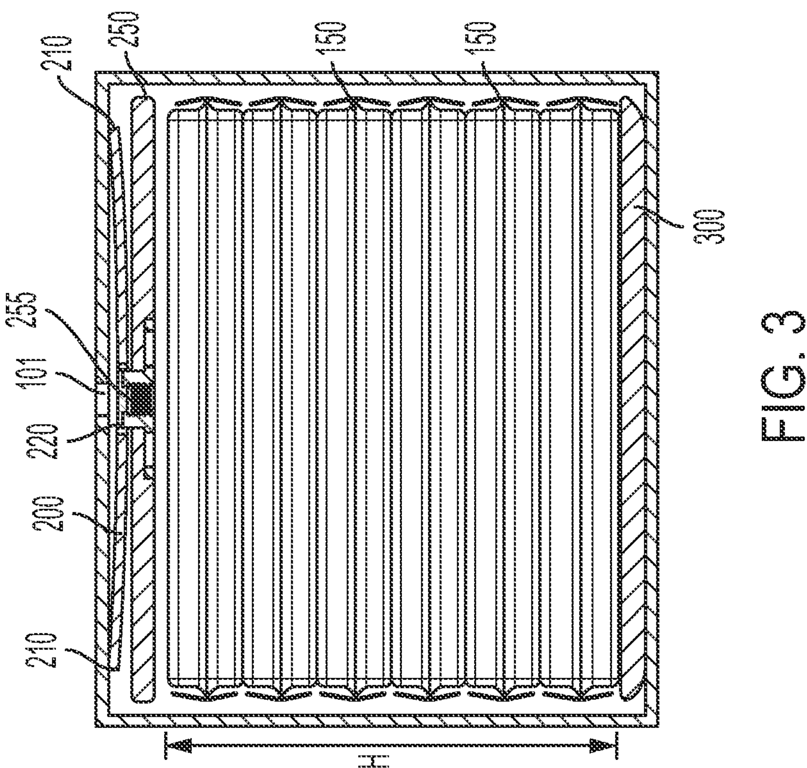
FIG. 3 illustrates a cross-sectional view of a battery according to an example embodiment.

FIGS. 3 and 4 illustrate cross sectional views of the battery 10. The battery cells 150 may each be at various states of charge (SOC) from a 0% SOC to a 100% SOC and the battery cells 150 collectively may be at various SOCs ranging from 100% SOC where all of the plurality of cells 150 are fully charged 150 to 0% SOC where all of the plurality of cells 150 are fully discharged.

FIG. 3 illustrates the battery 10 in a state where all of the plurality of battery cells 150 are fully charged (i.e., a 100% state of charge (SOC)). FIG. 4 illustrates the battery cells 150 in a fully discharged state in which all of the plurality of battery cells 150 are fully discharged (i.e., a 0% state of charge (SOC). As shown, a height H of battery cells 150 decreases when the battery cells have a lower state of charge. That is, when the battery cells 150 are fully charged (100% SOC) as shown in FIG. 3, the battery cells 150 have a larger height H than when the battery cells 150 are less than fully charged (e.g., 50% SOC) or fully discharged (0% SOC) as shown in FIG. 4.

As shown in FIGS. 3 and 4, the spring plate 200 of the example embodiment provides a compressive force against the plurality of battery cells 150 regardless of the particular SOC. In particular, the spring plate 200 provides a downward biasing force against the top plate 250. The top plate 250 then provides a biasing force to compress the plurality of battery cells 150. Thus, the spring plate 200 provides a biasing force to the plurality of battery cells 150 through the top plate 250. The biasing force serves as a compressive force that acts in a direction of compressing the battery cells 150. Because the top plate 250 is flat and has a size and shape that is generally the same as a top surface of the battery cells 150, the compressive force may be substantially uniform. In other embodiments, the spring plate 200 may provide a biasing force to the battery cells 150 without a top plate therebetween.

Figure 6:
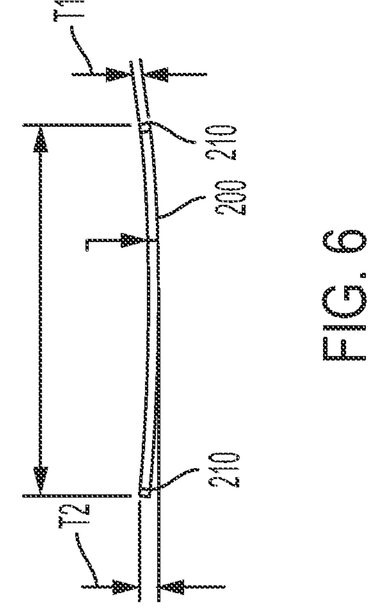
FIG. 6 illustrates another front view of a spring plate according to an example embodiment.
Figure 5:
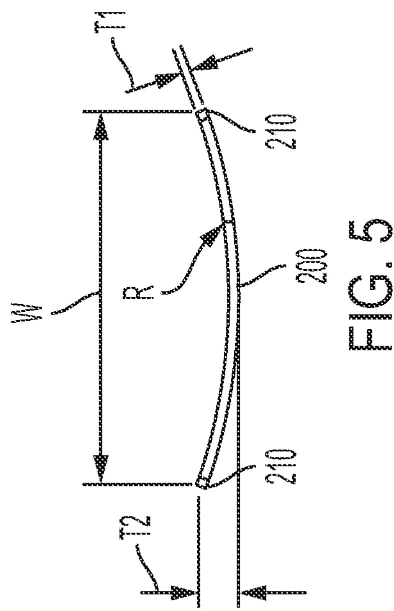
FIG. 5 illustrates a front view of a spring plate according to an example embodiment.

FIGS. 5 and 6 illustrate front views of the spring plate 200. FIG. 5 illustrates a front view of the spring plate 200 corresponding to FIG. 3 in which the battery cells 150 are fully charged (100% SOC). FIG. 6 illustrates a front view of the spring plate 200 corresponding to FIG. 4 in which the battery cells 150 are fully discharged (0% SOC). As shown in FIGS. 5 and 6, the plate has a thickness T1, an extension thickness T2, a width W and a radius of curvature R.

Thickness T1 is a thickness of the spring plate 200 measured from a top surface of the spring plate 200 to a bottom surface of the spring plate 200. The thickness T1 may be, for example, 0.4 inches or greater or 0.5 inches or greater. The width W is an arc length of the spring plate 200 measured from one edge 210 of the spring plate 200 to the opposite edge 210 along the arc path of the spring plate 200. The width W may be, for example, 2.0 inches or larger or 2.5 inches or larger. The thickness T1 and width W are constant values of the spring plate 200 that do not vary with the state of charge (SOC). That is, the thickness T1 is the same in the state of the spring plate 200 in FIG. 5 and FIG. 6. Similarly, the width W that is an arc length is the same in the state of the spring plate 200 in FIG. 5 and FIG. 6.

The radius of curvature R is a radius of curvature of the spring plate 200 and the extension thickness T2 is a vertical span of the spring plate 200. As shown in FIGS. 4, 5 and 6, the thickness T2 is measured from an edge 210 of the spring plate 200 to a central portion of the spring plate 200. As shown in FIG. 4, edges 210 of the spring plate 200 contact a top inner surface of the housing 100 and a central portion of the spring plate 200 contacts the top plate 250. Accordingly, the thickness T2 is also commensurate with the distance that the spring plate 200 spans from the housing 100 to the top plate 250. Additionally, when the battery housing 100 is placed on a flat horizontal surface, the distance T2 is a vertical span of the spring plate 200.

As shown in FIGS. 3-6, both the radius of curvature R and the extension thickness T2 vary with a state of charge (SOC) of the battery cells 150. In particular, as shown in FIGS. 3 and 5, when the battery cells 150 are fully charged, a vertical height of the battery cells 150 is at a maximum. The radius of curvature R is also at a maximum while the extension thickness T2 is at a minimum. That is, since the battery cells 150 have a large vertical height when at a full state of charge (SOC) as shown in FIG. 3, the space occupied by the spring plate 200 is relatively small and the relative flatness of the spring plate 200 results in a large radius of curvature R. Since the spring plate 200 is more compressed in FIG. 3 than in FIG. 4, it provides a larger compressive force against the battery cells 150 in the state shown in FIG. 3 than in the state shown in FIG. 4.

The battery cells 150 may shrink as the battery cells 150 are discharged and expand as they are charged. As the battery cells 150 are discharged and the SOC of the battery cells 150 decreases, a vertical height H of the battery cells 150 decreases. The spring plate 200 expands its extension thickness T2 and the radius of curvature R of the spring plate decreases. Accordingly, a radius of curvature R of the spring plate 200 varies as a SOC of one or more of the plurality of battery cells 150 changes. In particular, the radius of curvature R of the spring plate 200 increases as one or more of the plurality of battery cells 150 is discharging.

As discussed above, the spring plate 200 provides a dynamic compression force for the stacked plurality of battery cells 150. That is, the spring plate 200 provides a compression force to the stacked plurality of battery cells 150 in the maximum SOC shown in FIG. 3 and also at the minimum SOC shown in FIG. 4. Additionally, the compression force changes as the SOC of one or more of the plurality of battery cells 150 changes and one or more of the plurality of battery cells 150 shrink or expand so that the height H of the stacked plurality of battery cells 150 changes. In particular, a compression force provided by the spring plate 200 in FIG. 3 when the battery cells 150 have a maximum state of charge is larger than the compression force provided by the spring plate 200 when the battery cells are at a minimum state of charge as shown in FIG. 4.

The spring plate 200 may be designed and configured such that it provides an appropriate amount of compression force as the state of charge of the plurality of battery cells 150 changes. For example, the spring plate 200 may be configured to provide a targeted compression force at a 100% SOC (FIG. 3). Various attributes of the spring plate 200 may be altered to achieve the targeted compression force. For example, a size, material, thickness, or radius of curvature of the spring plate 200 may be chosen to provide a targeted compression force.

The spring plate 200 may also be designed and configured to provide a targeted compression force when the plurality of battery cells 150 are at a minimum state of charge (e.g., 0% SOC). That ensures that the plurality of battery cells 150 receive a compression force from the spring plate 200 through the top plate 250 even as the plurality of battery cells 150 are discharged and meet a minimum state of charge. The spring plate 200 may be configured to provide a targeted compression force throughout the charging and discharging cycles of the battery cells 150.

The plurality of battery cells 150 may include lithium. In lithium-ion battery cells, there is a risk of developing lithium plating/dendrites. In particular, there may be a risk of developing plating/dendrites if there is a large change in a compression distribution on one or more of the plurality of battery cells 150. According to the example embodiment, the spring plate 200 provides a compression force regardless of the SOC of plurality of battery cells 150. That is the spring plate 200 provides a compression force when the plurality of battery cells 150 are fully charged (100% SOC) as shown in FIG. 3, when the plurality of battery cells 150 are fully discharged (0% SOC) as shown in FIG. 4 and at all states of charge in between. Since the spring plate 200 provides a compression force regardless of the SOC of the plurality of battery cells 150, the battery cells 150 are subject to a compressive force throughout their SOC charging and discharging cycles. Thus, the example embodiment may help prevent the development of plating/dendrites. The battery 10 of the example embodiment may also help to resolve active area cell compression distribution issues and ensure healthy aging of the battery cells 150 so as to minimize degradation as the battery cells 150 are charged and discharged through many cycles.

The radius of curvature R, extension thickness T2 and compression force of the spring plate 200 all vary according to the SOC of the plurality of battery cells. A maximum radius of curvature R may be at least 50% greater than a minimum radius of curvature (i.e., the maximum radius of curvature may be at least 1.5 times a minimum radius of curvature), at least 2.0 times a minimum radius of curvature R, at least 3 times a minimum radius of curvature or at least 4 times a minimum radius of curvature. A maximum extension thickness T2 may be at least 1.5 times a minimum extension thickness T2, at least 2.0 times a minimum extension thickness T2 or at least 2.5 times a minimum extension thickness. A maximum compression force provided by the spring plate 200 may be at least 2.0 times a minimum compression force, at least 3.0 times a minimum compression force, at least 4.0 times a minimum compression force or at least 5.0 times a minimum compression force. In some embodiments, a maximum compression force provided by the spring plate 200 may be less than 10 times a minimum compression force, less than 8 times a minimum compression force or less than 6 times a minimum compression force.

In an example embodiment, the minimum compression force provided by the spring plate 200 may be at least 20 lbs of compression force or at least 25 lbs of compression force. This may ensure that the plurality of battery cells 150 are always provided with a sufficient compression force. In the example embodiment, the minimum compression force is provided when the plurality of battery cells 150 are at a 0% SOC as shown in FIG. 4. The maximum compression force provided by the spring plate 200 may be between 200 and 300 lbs. In the example embodiment, the minimum compression force is provided when the plurality of battery cells 150 are at a 100% SOC as shown in FIG. 3. However, the minimum and maximum compression forces provided by the spring plate 200 of example embodiments are not limited thereto. A minimum and maximum compression force may be varied in various example embodiments. For example, a higher or lower maximum compression force may be chosen depending on the size, number, type, chemistry, shrinkage percentage or shape of the battery cells 150 or the application of usage of the battery 10.

The plurality of battery cells 150 may include one or both of primary battery cells and secondary battery cells.

Figure 7:
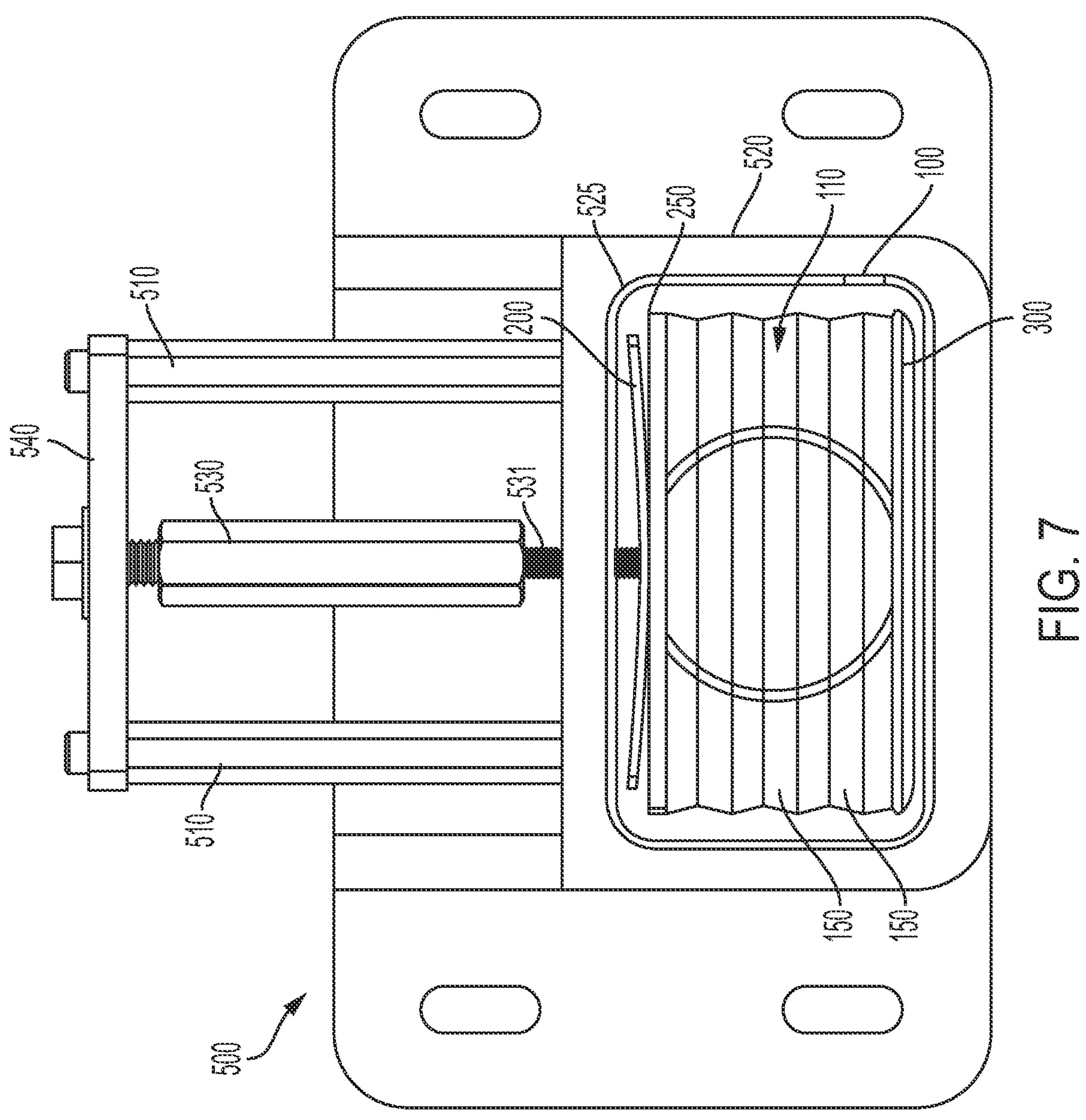
FIG. 7 illustrates a tensioner and a battery according to an example embodiment.
Figure 8:
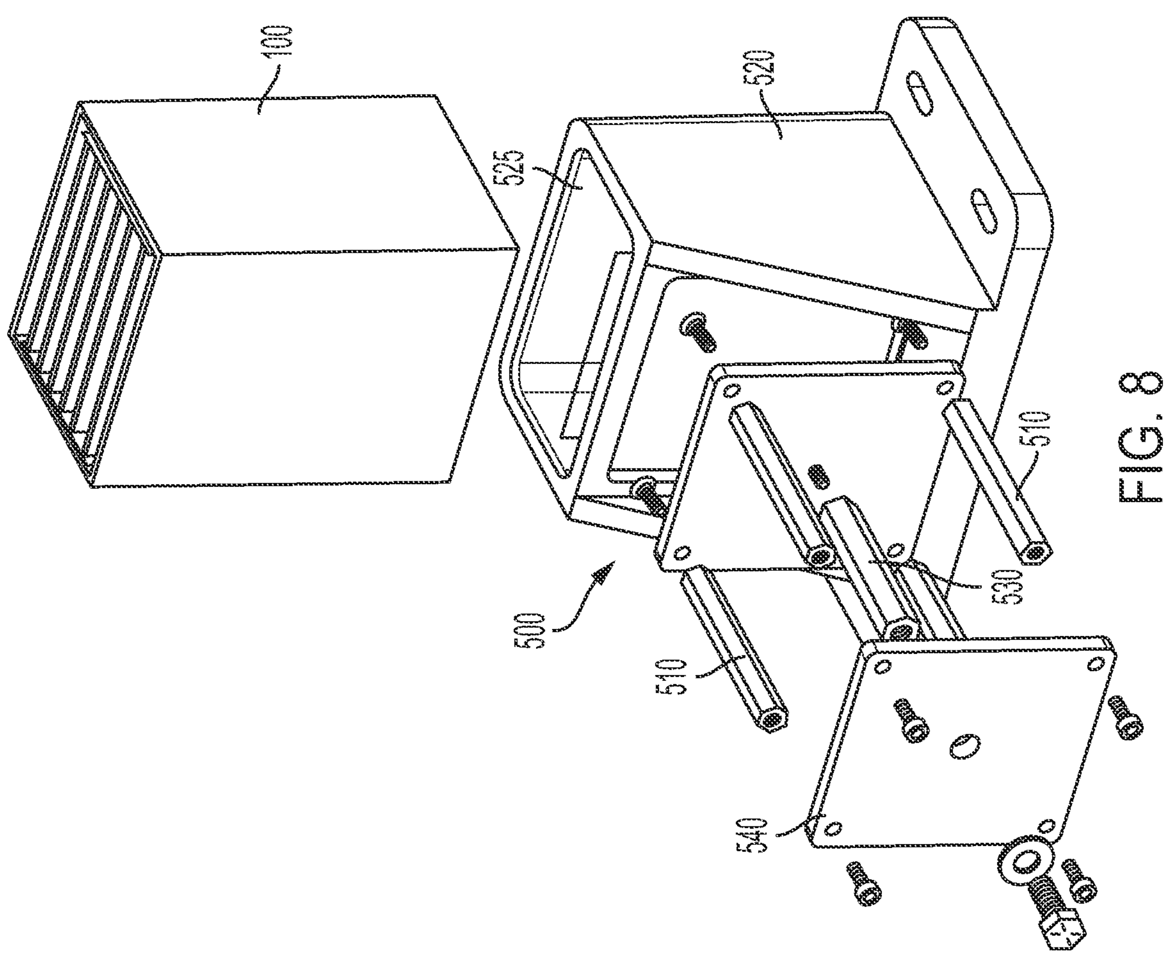
FIG. 8 illustrates an exploded view of a tensioner and a battery according to an example embodiment.

The configuration of the example embodiment of the battery 10 may also aid in assembly of the battery 10 and, in particular, insertion of the battery cells 150 into the housing 100. FIGS. 7 and 8 illustrates a tensioner that may be used for assembly of the battery 10.

As shown in FIGS. 7 and 8, the tensioner 500 includes a base 520. The base includes an opening 525 sized to receive the housing 100 of the battery 10. The tensioner 500 further includes a base plate 540 and support rods 510 between the base plate 540 and the opening 525. The tensioner also includes an adjustment rod 530 between the base plate 540 and the opening 525.

As discussed above and shown in, for example, FIG. 1, the housing 100 includes a top opening 101 on a top surface and the spring plate 200 includes an opening 220. The housing top opening 101 and the spring plate opening 220 align with each other and with the connector 255 of the top plate 250. These engagement portions allow access from outside of the housing 100 and allow for the tension of the spring plate 200 to be changed from outside of the housing 100. This can be seen, for example, in FIGS. 2-4.

As shown, the connector 255 of the top plate 250 may be accessed from outside of the housing 100 through the top opening 101 and the spring plate opening 220. For example, a tensioner, such as tensioner 500 shown in FIGS. 7 and 8, may connect to the connector 255 of the top plate 250. The tensioner 500 may then pull upwardly on the connector 255 to pull the top plate 250 upward towards a top of the housing 100 and compress the spring plate 200 between the top plate 250 and the housing 100. The tensioner 500 may be configured such that the top plate 250 can be pulled upwardly or released to a certain height. That is, the tensioner 500 may adjust the top plate 250 to a particular position and, thus, may be used to adjust the spring plate 200 to a certain position and compression.

The tensioner 500 may aid in assembly of the battery 10. In particular, the battery housing 100 may be placed in the opening 525 of the tensioner 500. The spring plate 200 and the top plate 250 may be provided in the housing 100. An attachment thread 531 of the adjustment rod 530 may be engaged with the connector 255 of the top plate 250. The attachment thread 531 may project through the housing opening 101 and the spring plate opening 220 to reach the connector 255. As discussed above, the connector may be a mounting nut, but embodiments are not limited thereto.

After the attachment thread 531 of the adjustment rod 530 is attached to the connector 255 of the top plate 250, the tensioner 500 may be used to adjust the position of the top plate 250 and thus the tension of the spring plate 200. In particular, the adjustment rod 530 may be rotated in a first direction to pull the top plate 250 upward and increase compression of the spring plate 200. As the top plate 250 is moved upwardly, there is a larger open space in the housing 100 making it easier to insert other components into the housing 100, particularly the battery cells 150. After the top plate 250 has been moved sufficiently upwardly, sufficient space is created that one or more battery cells 150 may easily be inserted into the housing 100. The bottom plate 300 may be inserted before the battery cells 150 or after the battery cells 150 and may be inserted before or after the top plate 250 is moved upwardly by the tensioner 500.

Once the bottom plate 300 and the battery cells 150 are inserted into the housing 100, the tensioner 500 may release the top plate 250 to allow the compression force of the spring plate 200 to act on the stack of battery cells 150. The adjustment rod 530 may be rotated in a second direction, opposite the first direction, to allow the top plate 250 to move downwardly and the attachment thread 531 may be removed from the connector 255 to separate the tensioner 500 from the top plate 250. Thereafter, the housing 100 may be removed from the opening 525 and so from the tensioner. The lid 120 may be attached onto the housing 100 after the battery cells 150 and spring plate 200 and other components are assembled into the housing 100. The lid 120 may be attached while the housing 100 is still in the opening 525 or after the housing 100 is removed from the opening. Using the tensioner 500 to preload the spring plate 200 may allow for easy insertion of the battery cells 150 and avoids any unnecessary battery level components or weight.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

What is claimed is:

1. A battery assembly, comprising:

a housing being a rectangular box and having a top surface and a bottom surface, the top surface comprising a housing top opening;

a plurality of battery cells disposed in the housing;

a bottom plate below the plurality of battery cells and adjacent to the bottom of the housing;

a top plate having an engagement portion in the form of a connector at a central location thereof, the top plate being located above the plurality of battery cells;

a spring plate between the top plate and the top of the housing;

wherein the spring plate includes a spring plate opening, is curved and has a radius of curvature;

wherein the spring plate is configured to provide a biasing force to the plurality of battery cells through the top plate, and wherein the housing top opening and the spring plate opening align with each other and with the connector of the top plate so as to allow for the tension of the spring plate to be changed from outside the housing.

2. The battery assembly of claim 1, wherein the spring plate opening is configured to be engaged by a tensioner.

3. The battery assembly of claim 1, wherein a radius of curvature of the spring plate varies as a state of charge of one or more of the plurality of battery cells changes.

4. The battery assembly of claim 3, wherein the radius of curvature of the spring plate increases as one or more of the plurality of battery cells is discharging.

5. The battery assembly of claim 4, wherein the radius of curvature is configured to vary such that a maximum of the radius of curvature is 50% or more greater than a minimum of the radius of curvature.

6. The battery assembly according to claim 1, wherein the connector is a threaded connector.

7. The battery assembly according to claim 6, wherein the threaded connector is a mounting nut.

8. The battery assembly according to claim 7, further comprising an adjustment rod attached to the connector of the top plate.

9. The battery assembly according to claim 8, wherein the adjustment rod is configured to be rotated in a first direction to pull the top plate upward and increase compression of the spring plate.

10. The battery assembly according to claim 9, wherein the adjustment rod is configured to be rotated in a second direction, opposite the first direction, to allow the top plate to move downwardly and decrease compression of the spring plate.

11. A method of assembling a battery, the method comprising:

providing a housing which is a rectangular box having a top surface and a bottom surface, the top surface comprising a housing top opening;

providing in the housing a top plate having an engagement portion in the form of a connector at a central location thereof, providing a spring plate in the housing wherein the spring plate includes a spring plate opening, is curved and has a radius of curvature;

wherein the housing top opening and the spring plate opening align with each other and with the connector of the top plate so as to allow for the tension of the spring plate to be changed from outside the housing, tensioning the spring plate from outside the housing through the housing top opening by a tensioner;

inserting a plurality of battery cells into the housing; and releasing the tensioning of the spring plate by the tensioner.

12. The method of claim 11, further comprising assembling a lid on the housing to enclose the plurality of battery cells and the spring plate in the housing.

13. The method of claim 12, wherein the radius of curvature of the spring plate varies as the plurality of battery cells are discharging.

* * * * *